United States Patent [19]
Tanaka et al.

[11] Patent Number: 5,724,602
[45] Date of Patent: Mar. 3, 1998

[54] MULTIPROCESSOR APPARATUS

[75] Inventors: Nobuyoshi Tanaka, Yamato; Akihiro Ogura, Sagamihara, both of Japan

[73] Assignee: International Business Machines Corporation, Armonk, N.Y.

[21] Appl. No.: 729,736

[22] Filed: Oct. 7, 1996

[30] Foreign Application Priority Data

Dec. 26, 1995 [JP] Japan ................................. 7-339048

[51] Int. Cl.⁶ .................................................. G06F 15/76
[52] U.S. Cl. ................................................. 395/800.32
[58] Field of Search ........................ 364/DIG. 1, DIG. 2; 395/501, 502, 505, 506, 376, 800.1, 800.23, 800.32

[56] References Cited

U.S. PATENT DOCUMENTS

| | | | |
|---|---|---|---|
| 5,337,410 | 8/1994 | Appel | 395/501 |
| 5,485,559 | 1/1996 | Sakaibara et al. | 395/133 |
| 5,539,898 | 7/1996 | Trevett et al. | 395/494 |

*Primary Examiner*—Robert B. Harrell
*Attorney, Agent, or Firm*—Daniel E. McConnell; George E. Grosser

[57] ABSTRACT

A multiprocessor information handling system that can absorb a load imbalance without increasing a size of a data buffer.

1 Claim, 5 Drawing Sheets

| | case (a) | case (b) | case (c) |
|---|---|---|---|
| parallel processor 1 | 1 | 2 | 2 |
| parallel processor 2 | 3 | 1 | 8 |
| parallel processor 3 | 2 | 5 | 1 |
| parallel processor 4 | 1 | 1 | 3 |

MULTIPROCESSOR APPARATUS

BACKGROUND OF THE INVENTION

The present invention relates to a multiprocessor apparatus of the type which distributes sequentially received data to a plurality of parallel processors for performing parallel processing with these data; and in particular to a multiprocessor apparatus that can be used for graphic processing for the generation and display of a computer graphics image on a display. More specifically, the present invention pertains to a multiprocessor apparatus that can be used for texture mapping where patterns (e.g., marble, tree bark, aluminum) are attached to the surface of a three-dimensional object.

In accordance with recent technical improvements, the field for the utilization of computers has been enlarged. The processing of graphics and images by using computers (so-called computer graphics) is one example. Currently, as the graphics processing function of computers is being improved, so-called in the spotlight are "three-dimensional graphics" whereby two-dimensional images for three-dimensional objects are being generated and displayed. Three-dimensional graphics is a technique whereby a mathematical model is used to represent an optical phenomenon for a three-dimensional object that is irradiated by a light source, to generate an image wherein shading or gradation is provided for the surface of an object in accordance with the model, and to display the image on a screen as a three-dimensional image. The three-dimensional graphics technique is more frequently employed for CAD/CAM in science, engineering, manufacturing, and other fields, and in various software development fields.

The three-dimensional graphics process commonly includes two procedures: "modeling" and "rendering". Modeling is the method that is used for the input to a computer of data concerning the shape, the color, and the surface condition of a three-dimensional object (e.g., an air plane, a building, or a cat) that is to be represented on a screen, and for the editing performed by the computer.

In the modeling, data that express an object are fetched by a computer in a form that can be used in a succeeding rendering process. The modeling methods are, for example, CSG (Constructive Solid Geometry), polygon modeling, Bezier modeling, and metaball modeling.

Rendering is the method that is used for determining how an object appears from a certain position, and for generating an image in accordance with that appearance. More specifically, three-dimensional data (e.g., the position of a light source relative to an object, highlighting, shadows, colors) prepared by a modeler are employed to perform coloring and shading for the surface of the three-dimensional object. The rendering is further divided in detail into "coordinate transformation", "hidden plane erasure", "shading", and "a measure for providing a realistic appearance". "Coordinate transformation" is a procedure that is used for the transformation of coordinate values that define a model into coordinate values on a screen when the model is observed from a specific viewpoint. "Hidden plane erasure" is a procedure that is used for the determination of the visible portions and the hidden portions of a model from the viewpoint of the present. A specific example of hidden plane erasure is the Z buffer method. "Shading" is a procedure that is used for the determination of the colors and brightness of the individual portions of an object when illumination is taken into consideration, and for the painting with these colors of pertinent pixels on a screen. "A measure for providing a realistic appearance" is a procedure that is normally performed after the rendering process. The reasons for performing this measure are 1) the individual graphics procedures, including rendering, are based on the assumption that the surface of an object is an ideally flat plane or a thoroughly smooth curve that can be represented by using a mathematical expression, or that the color of the surface is constant for each plane; and 2) an image obtained through coordinate transformation, hidden plane erasure, and shading is an unrealistic rendition that is far from a representation of a real object. "A measure for providing a realistic appearance" is, for example, mapping, i.e., pattern data prepared in advance are attached to the surface and the flat plane of the object.

Mapping is important in order for the property of the material of an object to be represented exactly. One mapping example is texture mapping. The texture is a two-dimensional pattern or image that is used to add the complexity of the material of an object's surface (or the surface pattern or marking). Texture mapping is performed by preparing in advance a bit map of the texture of each material (e.g., marble, tree bark, aluminum) and by attaching it to the relatively smooth surface, or the curved surface of the object, immediately after the rendering has been performed. With texture mapping, an object designed with a monotonous surface can be given a realistic object appearance with a complex surface. For example, for a flight simulator, texture mapping for a photographic image of a scene that has been taken in advance is performed on a background portion, so that a realistic virtual image can be generated at high speed. Or, a simple rectangular parallelepiped model can be made to look like metal or a stone.

Texture mapping requires access to an enormous amount of data and involves a great deal of computation processing. This is because the amount of texture data (i.e., two-dimensional array data representing images, such as a pattern to be attached and a background) is enormous. There is a limitation on the amount of texture mapping that can be performed in real time by a single processor, and a plurality of pipe lines must be provided to enable the performance of parallel processing. The parallel processing for texture mapping is accomplished, for example, by dividing a screen into a plurality of areas and by distributing the processing for each area to one of a plurality of parallel processors.

FIG. 5 is a schematic diagram illustrating the hardware arrangement of a multiprocessor system 100. The multiprocessor system 100 comprises a dispatch processor 10; a plurality (four in FIG. 5) of parallel processors 30-1 through 30-4; first-in first-out (FIFO) buffers 20-1 through 20-4 that are respectively provided for the parallel processors 30-1 through 30-4; and a merge processor 40. The dispatch processor 10 is a computation unit that distributes sequentially received data sets (in this specification, one unit of data to be distributed is called a "data set"; the same term is applied hereinafter) to the parallel processors 30-1 through 30-4 in accordance with data attributes, etc. The FIFOs 20-1 through 20-4, which are located before the corresponding parallel processors 30-1 through 30-4, temporarily store the distributed data sets, and successively transmit the data sets to the parallel processors 30-1 through 30-4 as they complete the data processing for preceding data sets. The merge processor 40 is a computation unit that again merges the data sets that were distributed by the dispatch processor 10 and were processed by parallel processors 30-1 through 30-4, and outputs the result.

It is preferable that in the multiprocessor system the load (i.e., the amount of data to be processed per unit time) that is imposed on each parallel processor be equal. So long as the load is equally imposed, efficient parallel processing is performed, and theoretically, the performance of the entire system is improved in proportion to the number of pipe lines, i.e., the number of the parallel processors. For the system shown in FIG. 5, for example, a well-balanced design is one where the general processing speed of the parallel processors is in proportion to the speed of the data input to the system 100. In other words, if the loads are not equalized, the effect expected from the distributed processing can not be acquired.

In the multiprocessor system 100 shown in FIG. 5, at a certain moment, imbalances in the data (loads) distributed to the parallel processors 30-1 though 30-4 occur relatively frequently. Such a phenomenon occurs when, for example, a data set is unequally distributed to the processors, as is shown in (a), (b) and (c) in FIG. 6. Even when the loads on the parallel processors 30-1 through 30-4 are found to be equal by averaging the loads over a long period of time, a load imbalance often occurs at certain moments, depending on the order in which the data sets are arranged. As a result of an accumulation of data sets unequally distributed, it is probable that, along one pipe line, data sets that are waiting to be processed will overflow from an FIFO. Accordingly, the dispatch processor can not distribute a succeeding data set to the FIFO that is filled with data sets, therefore, the data distribution for the entire system will be halted because only one of the pipe lines is busy. In other words, the effects obtained by distributed processing can not be demonstrated.

If equal distribution over a long period of time is ensured, the number of stages of each FIFO buffer is defined as infinite (or sufficiently great as to be assumed to be infinite), so that a temporary Load variance can be corrected. For example, to absorb the imbalance of the Load shown in (a) in FIG. 6, an FIFO having a minimum of three stages must be prepared. Similarly, to absorb the imbalance of the loads shown in (b) and (c) in FIG. 6, FIFOs having a minimum of five stages and eight stages respectively must be prepared, respectively. The increase in the number of stages for the FIFOs is an easy method by which to resolve an unequally distributed data condition.

Even when the data processing is intensively performed by one parallel processor and data overflows from its FIFO, the FIFOs for the other parallel processors are not overly filled with data. Thus, according to an easy method for increasing the FIFO size, an unused or an extra FIFO is accordingly increased. Suppose that a data set is distributed to a multiprocessor system, in which, for example, FIFOs having eight stages are provided, in accordance with the distribution shown in C in FIG. 6. In such a case, the stages that are used are 14, while the unused stages are 18. The FIFO that has a large number of stages is not expected to be constantly used, and will thus serve as a preparatory or extra device that is used when the distribution of data sets is not equal. The attachment of a memory device for which utilization efficiency is low constitutes a wasteful circuit design and a wasteful manufacturing procedure.

If equal distribution over a long period of time is ensured, the number of stages of each FIFO buffer is defined as infinite (or sufficiently great as to be assumed to be infinite), so that a temporary load variance can be corrected. For example, to absorb the imbalance of the load shown in (a) in FIG. 6, an FIFO having a minimum of three stages must be prepared. Similarly, to absorb the imbalance of the loads shown in (b) and (c) in FIG. 6, FIFOs having a minimum of five stages and eight stages respectively must be prepared, respectively. The increase in the number of stages for the FIFOs is an easy method by which to resolve an unequally distributed data condition.

Even when the data processing is intensively performed by one parallel processor and data overflows from its FIFO, the FIFOs for the other parallel processors are not overly filled with data. Thus, according to an easy method for increasing the FIFO size, an unused or an extra FIFO is accordingly increased. Suppose that a data set is distributed to a multiprocessor system, in which, for example, FIFOs having eight stages are provided, in accordance with the distribution shown in C in FIG. 6. In such a case, the stages that are used are 14, while the unused stages are 18. The FIFO that has a large number of stages is not expected to be constantly used, and will thus serve as a preparatory or extra device that is used when the distribution of data sets is not equal. The attachment of a memory device for which utilization efficiency is low constitutes a wasteful circuit design and a wasteful manufacturing procedure.

SUMMARY OF THE INVENTION

It is one purpose of the present invention to provide an excellent apparatus of the type which distributes sequentially received data to a plurality of processors to perform parallel processing.

It is another purpose of the present invention to provide an excellent multiprocessor apparatus for which there is not deterioration of performance even when loads distributed to parallel processors are temporarily unbalanced.

It is an additional purpose of the present invention to provide a multiprocessor apparatus that can absorb a load imbalance without requiring an increase in the number of stages for FIFOs (or in the size of data buffers) for the parallel processors.

To achieve the above objects, according to the present invention, a multiprocessor apparatus, which distributes sequentially received data sets to a plurality of pipe lines for processing, comprises: (a) a dispatch processor for distributing the received data sets to the pipe lines; (b) a plurality of parallel processors, provided on each of the pipe lines one by one, for processing distributed data sets; (c) a data buffer for temporarily storing more than one data sets sequentially outputted by the dispatch processor; (d) a plurality of pointer buffers, provided on each of the pipe lines before the corresponding parallel processor, for temporarily holding storage positions in the data buffer where data sets distributed to the corresponding parallel processor are stored; (e) a priority encoder for determining storage positions in the data buffer where the next distributed data set should be stored, and for writing the determined storage positions in the pointer buffers of the corresponding pipe lines; (f) a plurality of multiplexers, provided on each of the pipe lines between the parallel processor and the pointer buffers, for reading data sets from the storage positions in the data buffer where the corresponding pointer buffer indicates, and transmitting the data sets to the corresponding parallel processor; and (g) a merge processor for merging data sets processed by the parallel processors.

According to the multiprocessor apparatus of the present invention, a buffer (data FIFO) for storing data sets is not provided for individual pipe lines and is used in common by all the pipe lines. Instead of a data FIFO, each of the pipe lines has a pointer buffer (a pointer FIFO) for the inputting and the outputting of a storage position for a data set in the data FIFO used in common. When each of the parallel processors is to perform data processing, first, the parallel processor reads the storage position from its pointer FIFO, and then it reads a data set from the corresponding storage position in the data FIFO. The pointer FIFO provided along each pipe lines has a bit width that need only be sufficient for addressing the storage position in the data FIFO, and its capacity is small compared with when the entire data set is to be stored. As the data FIFO is used in common by the pipe lines, only one FIFO is required. According to the present invention, therefore, a load imbalance can be removed without increasing the size of a data buffer.

Since the multiprocessor apparatus of the present invention does not need an FIFO for which employment efficiency is low because of the use in common of the FIFO, design and manufacturing costs are low. In other words, the multiprocessor apparatus of the present invention demonstrates high speed performance with the same gate size.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
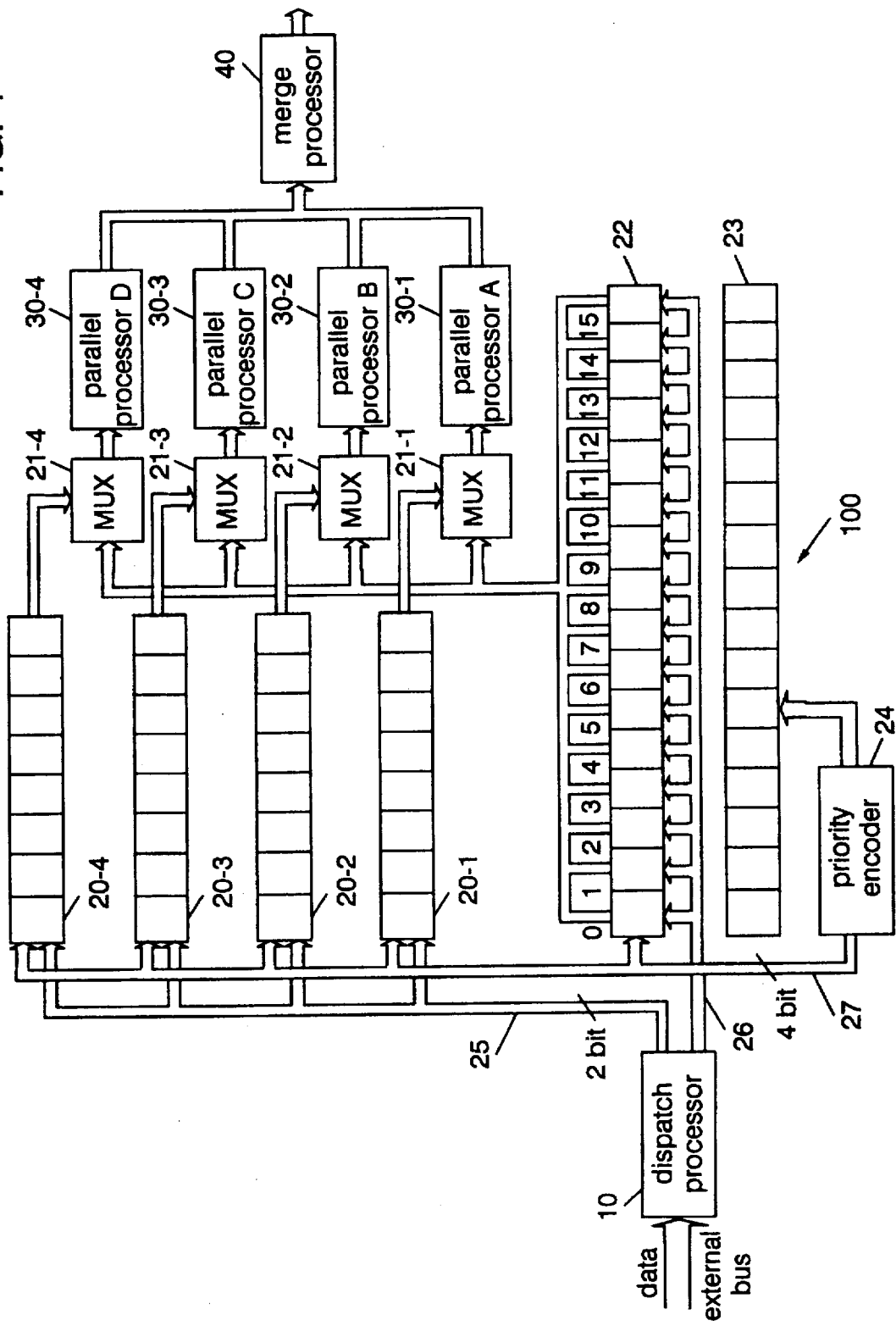
FIG. 1 is a diagram illustrating the hardware configuration of a multiprocessor system that is employed for carrying out the present invention.
Figure 2:
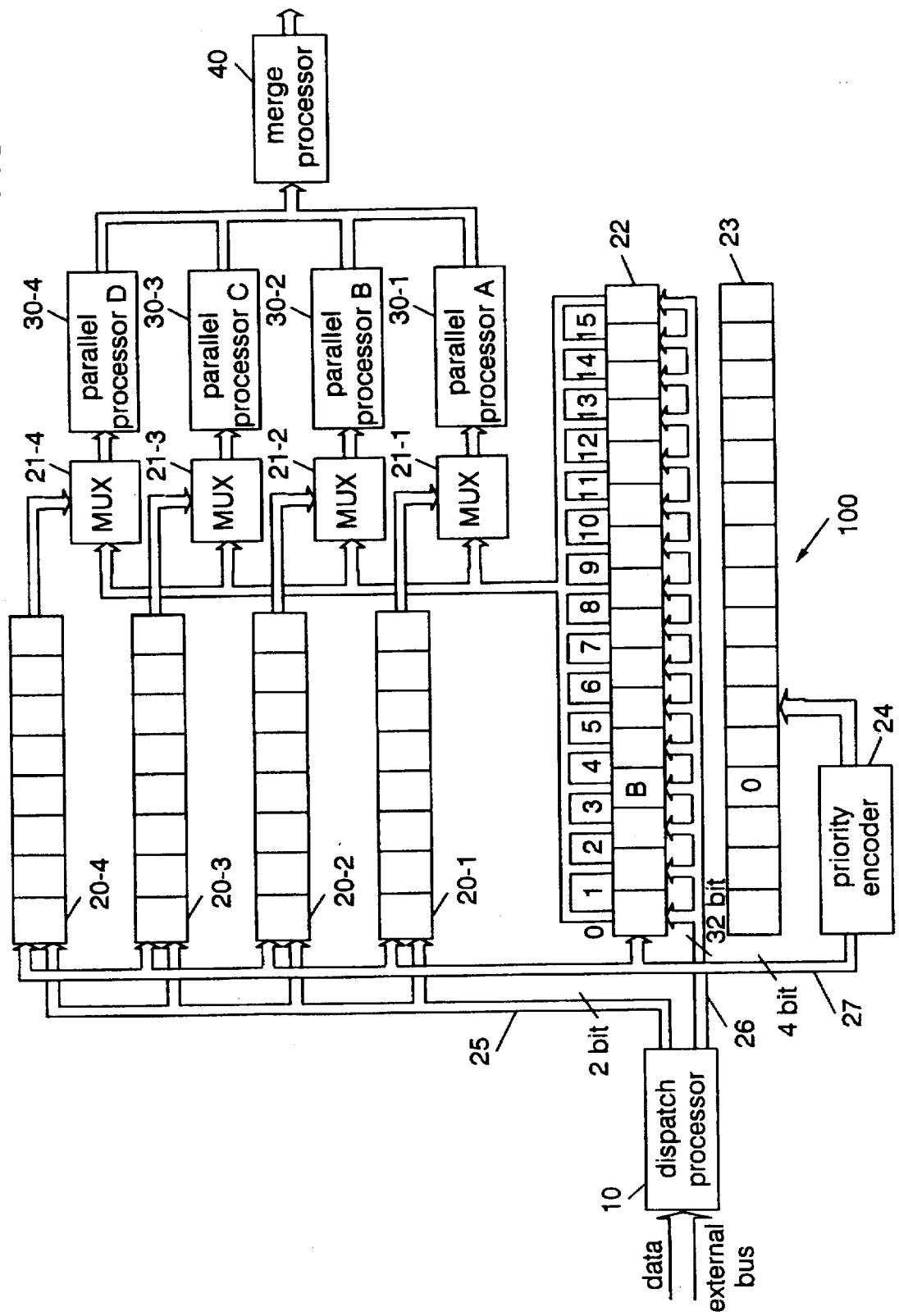
FIG. 2 is a diagram for explaining the processing for one embodiment, and more specifically, for showing the condition where a dispatch processor 10 distributes data sets in a multiprocessor system 100.

As is shown in FIG. 1, the multiprocessor system 100 comprises: a dispatch processor 10; a plurality of parallel processors 30; pointer FIFOs 20 and multiplexers 21 that are provided for the respective parallel processors 30; a data FIFO 22; enable bits 23; and a priority encoder 24. In FIG. 1, four pipe lines are provided; the parallel processors are denoted by 30-1, 30-2, 30-3 and 30-4; the pointer FIFOs are denoted by 20-1, 20-2, 20-3 and 20-4; and the multiplexers are denoted by 21-1, 21-2, 21-3 and 21-4, respectively. It should be noted that the number of pipe lines is merely a matter of design. Hardware blocks 10, 20 . . . in the system 100 are mounted on a single circuit chip using the ASIC technique, for example, together with buses (described later) for connecting the individual sections.

The dispatch processor 10 is a computation unit that distributes the sequentially received data sets to the parallel processors 30-1 through 30-4 in accordance with attributes of the data. The input terminal of the dispatch processor 10 is connected, by an external bus, to a device, e.g., a graphic workstation (not shown), that is provided outside of the multiprocessor system 100, so that it can receive data sets from the external device as needed. The output terminal of the dispatch processor 10 is connected to a select bus 25 and a data bus 26. The select bus 25 is used to transfer "select information" for designating a pipe line that serves as the destination for the distribution of an outputted data set, and communicates with the pointer FIFOs 20-1 through 20-4 along the pipe lines. The bit width of the select bus 25 need only be sufficient to address one of the pipe lines. In this embodiment, in accordance with the provision of four pipe lines, the select bus 25 has a 2 bit width. The data bus 26 is employed to transfer the substance of distributed data (data set), and communicates with the data FIFO 24. The bit width of the data bus 26 is, for example, 32 bits. It should be noted that the dispatch processor 10 in this embodiment does not directly distribute data sets to the FIFOs 20-1 through 20-4 along the pipe lines, which will be described later.

The data FIFO 22 is a buffer in which the substance of data that are sequentially outputted from the dispatch processor 10 is temporarily stored. Each field of the data FIFO 22 is set to the input enabled state in response to an instruction from the priority encoder 24 (which will be described later). It should be noted that the data FIFO 22 does not serve a specific pipe line, but is used in common by all the pipe lines. The data FIFO 22 has a shift type structure of 16 fields wherein 16 data sets can be held (the number of fields is a matter of design, and a ring FIFO may be used instead of a shift FIFO). Each stage of the data FIFO 22 is 32 bits, in accordance with the bit width of the data bus 26. The enable bits 23 are additionally provided for the data FIFO 22.

The enable bits 23 are bit flags whose settings indicate whether or not effective data (i.e., data to be processed) are stored in the individual fields of the data FIFO 22. Each time a data set is written in a field of the data FIFO 22, the corresponding bit flag in the enable bits 23 is set. When a data set is read from a field, the corresponding bit flag is reset.

The priority encoder 24 controls the data FIFO 22 and the enable bits 23, so that it can store the data sets sequentially outputted from the dispatch processor 10 and can distribute storage positions (pointers) to the pipe lines. More specifically, (1) the enable bits 23 are referred to (encoded) to find empty fields in the data FIFO 22;

(2) one of the empty fields is selected as a storage position for the data set that is next received; and (3) a selected storage position (pointer) is transmitted to the pointer FIFOs 20-1 to 20-4 and the data FIFO 22 by the pointer bus 27.

In the data FIFO 22, a field designated by the pointer bus 27 is set to the input enabled state. Upon receipt of a data set by the data bus 26, the data FIFO 22 stores it in the designated field. As the new data set is written, the corresponding bit flag in the enable bits 23 is set and the content of the field is validated. The pointer FIFO 20 consonant with the designated pipe line stores a pointer that has been received by the pointer bus 27 at the last stage. The bit width of the pointer bus 27 need only be sufficient to address the position in the data FIFO 22. In this embodiment, as the data FIFO 22 has 16 fields, the pointer bus 27 has a 4 bit width.

The enable bits 23 are bit flags whose settings indicate whether or not effective data (i.e., data to be processed) are stored in the individual fields of the data FIFO 22. Each time a data set is written in a field of the data FIFO 22, the corresponding bit flag in the enable bits 23 is set. When a data set is read from a field, the corresponding bit flag is reset.

The priority encoder 24 controls the data FIFO 22 and the enable bits 23, so that it can store the data sets sequentially outputted from the dispatch processor 10 and can distribute storage positions (pointers) to the pipe lines. More specifically, (1) the enable bits 23 are referred to (encoded) to find empty fields in the data FIFO 22;

(2) one of the empty fields is selected as a storage position for the data set that is next received; and (3) a selected storage position (pointer) is transmitted to the pointer FIFOs 20-1 to 20-4 and the data FIFO 22 by the pointer bus 27.

In the data FIFO 22, a field designated by the pointer bus 27 is set to the input enabled state. Upon receipt of a data set by the data bus 26, the data FIFO 22 stores it in the designated field. As the new data set is written, the corresponding bit flag in the enable bits 23 is set and the content of the field is validated. The pointer FIFO 20 consonant with the designated pipe line stores a pointer that has been received by the pointer bus 27 at the last stage. The bit width of the pointer bus 27 need only be sufficient to address the position in the data FIFO 22. In this embodiment, as the data FIFO 22 has 16 fields, the pointer bus 27 has a 4 bit width.

The parallel processor 30-1 performs a predetermined process for the data set received from the multiplexer 21-1, and outputs the resultant data set to the merge processor 40. The merge processor 40 merges the data sets received from the pipe lines, and transmits the merged data set to a device, e.g., a graphic workstation (not shown), that is provided outside the system 100. The processing performed by the parallel processor 30-1 and the merge processor 40 is not related to the subject of the present invention, and no further explanation for them will be given in this specification.

The multiprocessor system 100 in this embodiment is, for example, employed for texture mapping in a three-dimensional graphics process. In this case, the system 100 serves as one part of a graphic adaptor for three-dimensional processing, and the graphic adaptor itself is connected to a graphic workstation by a bus.

The parallel processor 30-1 performs a predetermined process for the data set received from the multiplexer 21-1, and outputs the resultant data set to the merge processor 40. The merge processor 40 merges the data sets received from the pipe lines, and transmits the merged data set to a device, e.g., a graphic workstation (not shown), that is provided outside the system 100. The processing performed by the parallel processor 30-1 and the merge processor 40 is not related to the subject of the present invention, and no further explanation for them will be given in this specification.

The multiprocessor system 100 in this embodiment is, for example, employed for texture mapping in a three-dimensional graphics process. In this case, the system 100 serves as one part of a graphic adaptor for three-dimensional processing, and the graphic adaptor itself is connected to a graphic workstation by a bus.

Figure 3:
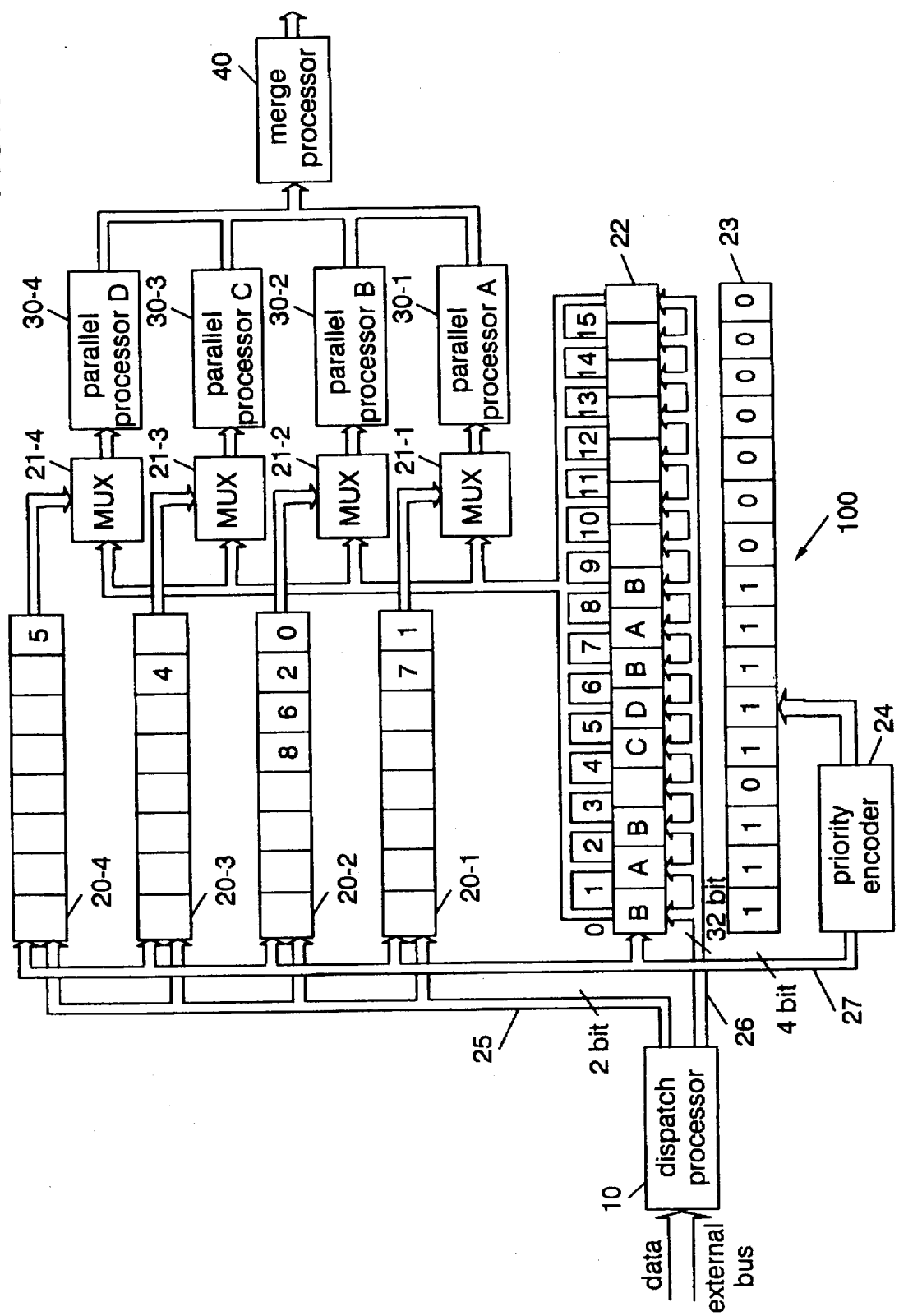
FIG. 3 is a diagram for explaining the processing for the embodiment, and more specifically, for showing data stored in pointers FIFO 20-1 through 20-4 and in a data FIFO 22 at a specific time.

In FIG. 3 is schematically shown the stored contents in the pointer FIFO 20-1 through 20-4 and the data FIFO 22 at a specific time. More specifically, data sets to be distributed to B, A, B, C, D, B, A, and B are written in fields 0, 1, 2, 4, 5, 6, 7, 8 and 9 in the data FIFO 22, respectively (it should be noted that the A through D are abbreviations of the parallel processors A (30-1), B (30-2), C (30-3) and D (30-4); the same usage is employed hereinafter). The fields other than these are unused (invalid). The bit flags of the enable bits 23 are set or reset in accordance with the states of the corresponding fields in the data FIFO 22.

Pointer values that reflect the stored positions in the data FIFO 22 are written in the respective pointer FIFOs 20-1 through 20-4 on the pipe lines. In FIG. 3, pointer values 1 and 7 are written in the first and the second stages from the output terminal of the pointer FIFO 20-1. In the pointer FIFO 20-2, pointer values 0, 2, 6 and 8 are respectively written in the first, the second, the third and the fourth stages from its output terminal. In the pointer FIFO 20-3, pointer value 4 is written in the second stage from its output terminal, and in the pointer FIFO 20-4, pointer value 5 is written in the first stage from its output terminal.

The multiplexer 21-1 reads pointer value 1 from the output terminal of the pointer FIFO 20-1, and extracts a data set from field 1 in the data FIFO 22 and transfers it to the parallel processor A. The multiplexer 21-2 reads pointer value 0 from the output terminal of the pointer FIFO 20-2, and extracts a data set from field 0 in the data FIFO 22 and transfers it to the parallel processor B. Since the first stage from the output terminal of the pointer FIFO 20-3 is empty, the multiplexer 21-3 does not extract a data set from the data FIFO 22. The multiplexer 21-4 reads pointer value 5 from the output terminal of the pointer FIFO 20-4, and extracts a data set from field 5 in the data FIFO 22 and transfers it to the parallel processor D. As the data sets are extracted, the bit flags at stages 0, 1, and 5 in the enable bits 23 are reset and the contents in the corresponding fields in the data FIFO 22 are invalidated.

The parallel processors A, B, . . . on the pipe lines perform a predetermined process for the data sets received from the respective multiplexers 21-1, 21-2, . . . , and output the resultant data to the merge processor 40. The merge processor 40 merges the received data sets and transfers the resultant data set to a device, e.g., a graphic workstation (not shown), that is provided outside of the system 100.

Figure 4:
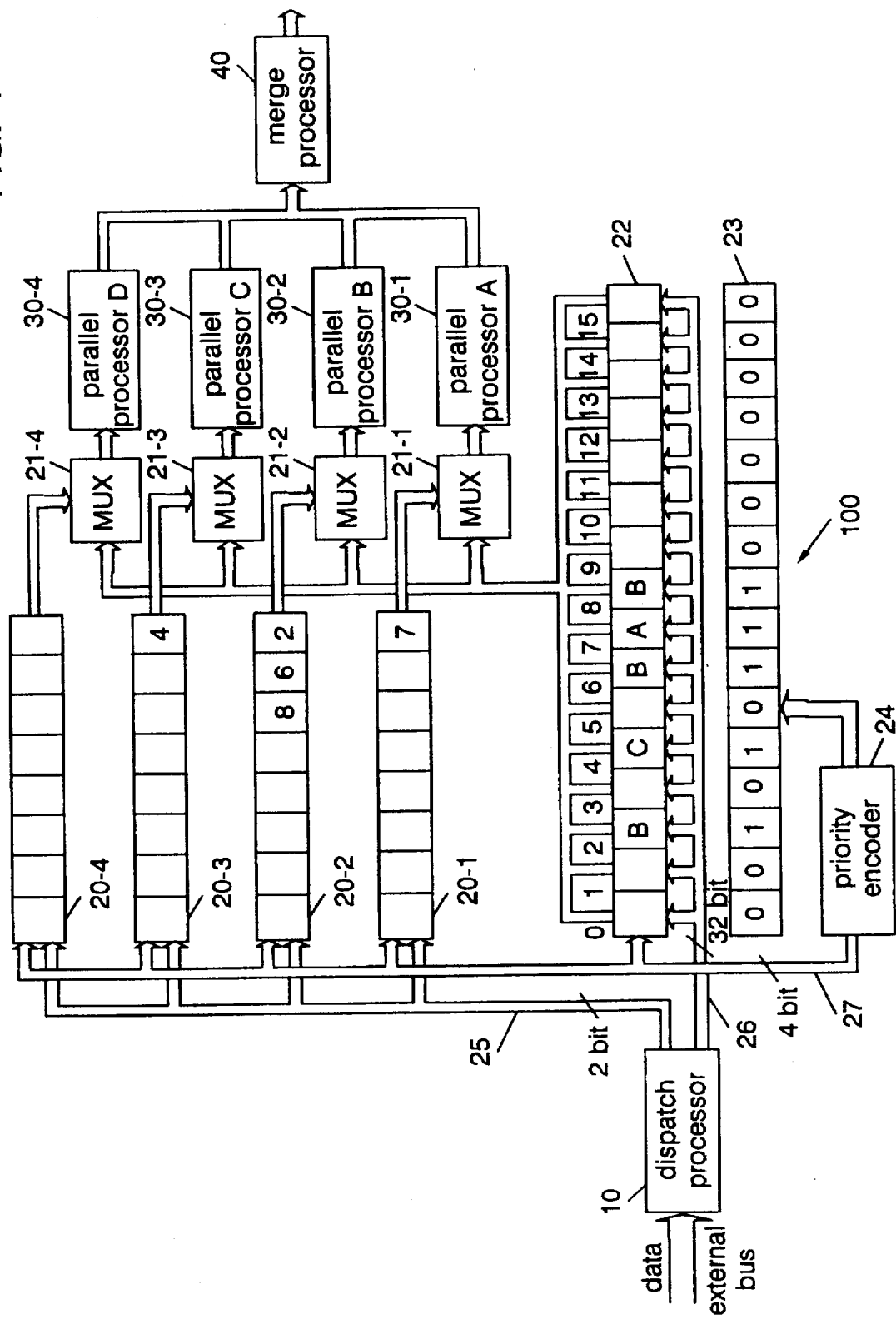
FIG. 4 is a diagram for explaining the processing for the embodiment, and more specifically, for showing data stored in the pointers FIFO 20-1 through 20-4 and in the data FIFO 22 at the time following the specific time shown in FIG. 3.
Figures 5, 6:
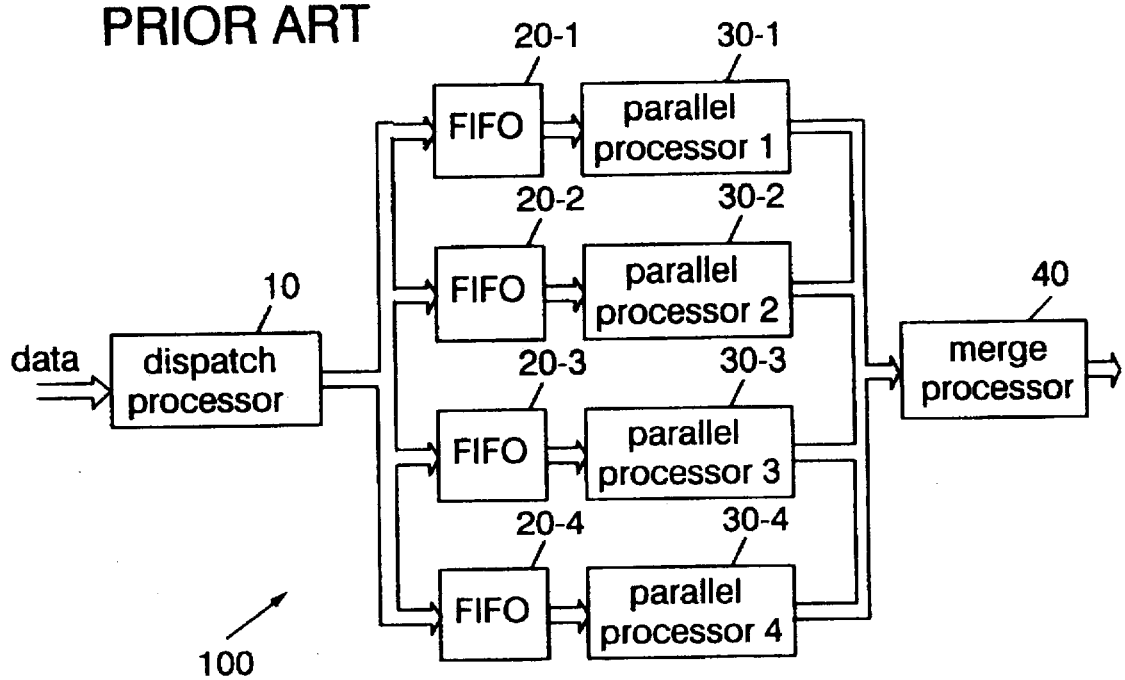
FIG. 5 is a schematic diagram illustrating the hardware configuration of a conventional multiprocessor system.
FIG. 6 is a diagram showing an example of imbalanced loads distributed to various processors (FIFOs).

In FIG. 4 is schematically shown the stored contents in the pointer FIFOs 20-1 through 20-4 and the data FIFO 22 at the time following the specific time shown in FIG. 3. More specifically, data sets to be distributed to B, C, B, A, and B are respectively written in fields 2, 4, 6, 7, 8 and 9 in the data FIFO 22. The fields other than these are unused (invalid). The bit flags of the enable bits 23 are set or reset in accordance with the states of the corresponding fields in the data FIFO 22.

Compared with the contents stored in the pointer FIFOs 20-1 through 20-4, the contents have been shifted by one stage toward the output terminal sides. More specifically, pointer value 7 is written in the first stage from the output terminal of the pointer FIFO 20-1. In the pointer FIFO 20-2, pointer values 2, 6 and 8 are respectively written in the first, the second and the third stages from its output terminal. In the pointer FIFO 20-3, pointer value 4 is written in the first stage from its output terminal, and in the pointer FIFO 20-4, no valid pointer value is present in the first stage from its output terminal.

The multiplexer 21-1 reads pointer value 7 from the output terminal of the pointer FIFO 20-1, and extracts a data set from field 7 in the data FIFO 22 and transfers it to the parallel processor A. The multiplexer 21-2 reads pointer value 2 from the output terminal of the pointer FIFO 20-2, and extracts a data set from field 2 in the data FIFO 22 and transfers it to the parallel processor B. The multiplexer 21-3 reads pointer value 4 from the output terminal of the pointer FIFO 20-3, and extracts a data set from field 4 in the data FIFO 22 and transfers it to the parallel processor C. Since the first stage from the output terminal of the pointer FIFO 20-4 is empty, the multiplexer 21-4 does not extract a data set from the data FIFO 22. As the data sets are extracted, the bit flags at the second, the fourth, and the seventh stages in the enable bits 23 are reset and the contents in the corresponding fields in the data FIFO 22 are invalidated.

The parallel processors A, B, ... on the pipe lines perform a predetermined process for the data sets received from the respective multiplexers 21-1, 21-2, ..., and output the resultant data to the merge processor 40. The merge processor 40 merges the received data sets and transfers the resultant data set to a device, e.g., a graphic workstation (not shown), that is provided outside of the system 100.

In the drawings and specifications there has been set forth a preferred embodiment of the invention and, although specific terms are used, the description thus given uses terminology in a generic and descriptive sense only and not for purposes of limitation.

What is claimed is:

1. A multiprocessor information handling system which distributes sequentially received data sets to a plurality of pipe lines for processing, comprising:

(a) a dispatch processor for distributing said received data sets to said pipe lines;

(b) a plurality of parallel processors, provided on each of said pipe lines one by one, for processing distributed data sets;

(c) a data buffer for temporarily storing more than one data sets sequentially outputted by said dispatch processor;

(d) a plurality of pointer buffers, provided on each of said pipe lines before the corresponding parallel processor, for temporarily holding storage positions in said data buffer where data sets distributed to the corresponding parallel processor are stored;

(e) a priority encoder for determining storage positions in said data buffer where the next distributed data set should be stored, and for writing the determined storage positions in the pointer buffers of the corresponding pipe lines;

(f) a plurality of multiplexers, provided on each of said pipe lines between the parallel processor and the pointer buffers, for reading data sets from the storage positions in said data buffer where the corresponding pointer buffer indicates, and transmitting the data sets to the corresponding parallel processor; and (g) a merge processor for merging data sets processed by said parallel processors.

* * * * *